United States Patent [19]
Hassid et al.

[11] Patent Number: 5,108,215
[45] Date of Patent: Apr. 28, 1992

[54] SET OF DEVICES FOR ASSEMBLING PANELS TOGETHER AND FOR CONNECTING TUBES

[76] Inventors: Jean-Pierre Hassid, 12, rue de la Grande Noue, F. 44340 - Bouguenais; Fabrice Hassid, deceased, late of Bouguenais; by Jean-Pierre Hassid, legal representative, 12, rue de la Grande Noue, F.44340 - Bouguenais, all of France

[21] Appl. No.: 406,827

[22] Filed: Sep. 12, 1989

Related U.S. Application Data

[63] Continuation of Ser. No. 72,367, filed as PCT/FR86/00329, Sep. 26, 1986, abandoned.

[30] Foreign Application Priority Data

| Nov. 12, 1985 [FR] | France | 85 16643 |
| Aug. 6, 1986 [FR] | France | 86 11367 |
| Sep. 5, 1986 [FR] | France | 86 12467 |

[51] Int. Cl.$^5$ .............................................. F16B 13/02
[52] U.S. Cl. ................................... 403/298; 403/350
[58] Field of Search ................. 403/405.1, 406.1, 397, 403/295, 403, 190, 191, 298, 292, 350, 351, 367, 374, 409.1, 348; 248/74.2; 24/495

[56] References Cited

U.S. PATENT DOCUMENTS

| 3,515,418 | 6/1970 | Nielsen, Jr. | 403/367 X |
| 3,666,298 | 5/1972 | Reilly | 403/298 X |
| 3,944,177 | 3/1976 | Yoda | 248/74.2 |
| 4,105,348 | 8/1978 | Anderson et al. | 403/295 X |
| 4,161,375 | 7/1979 | Murphy | 403/406.1 X |
| 4,242,969 | 1/1981 | Checkwood et al. | 403/295 X |
| 4,273,462 | 6/1981 | Fukuchi | 403/292 X |
| 4,470,179 | 9/1984 | Gollin et al. | 248/74.2 X |
| 4,566,660 | 1/1986 | Anscher et al. | 248/74.2 |
| 4,585,367 | 4/1986 | Gall | 403/367 X |
| 4,688,829 | 8/1987 | Shioda et al. | 248/74.2 X |
| 4,770,560 | 9/1988 | Ott | 403/350 X |

*Primary Examiner*—Peter M. Cuomo
*Attorney, Agent, or Firm*—Sughrue, Mion, Zinn, Macpeak & Seas

[57] ABSTRACT

An assembly system for assembling panels. A CAP device is a generally round cylinder having on its outer surface four cam surfaces which have an expanding diameter in the circumferential direction. The CAP device can be inserted into a square tube with its large diameter part on the diagonal of the tube and then turned so as to engage the tube. A CLIP device has two tongues pivoting on the end of a partial cylindrical section so that a tube can be inserted into the partial cylindrical section and forces panels attached to the tongues over the back of the tube. A toothed projection on the partial cylindrical section engages a panel.

4 Claims, 4 Drawing Sheets

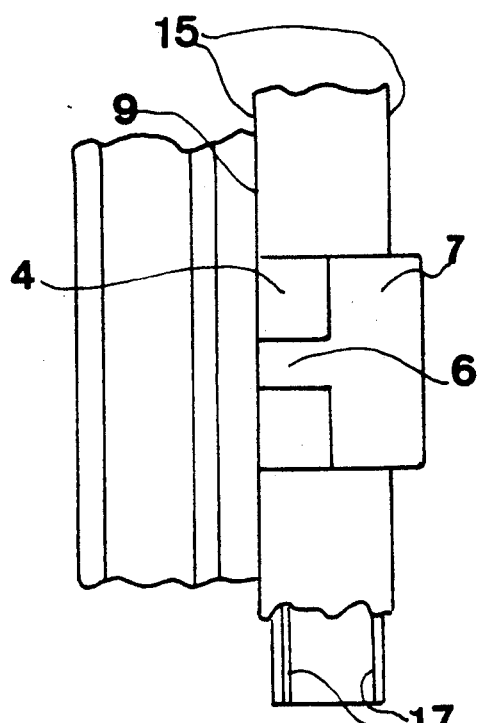
fig.1
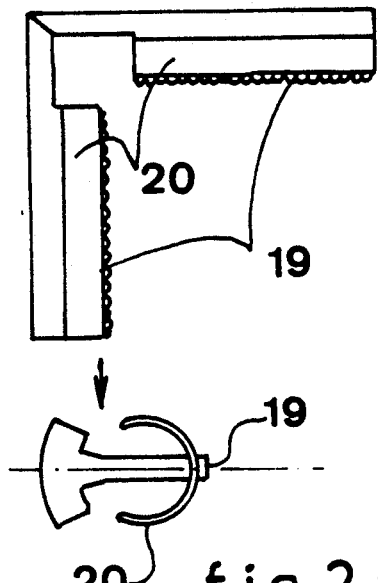
fig.2
fig.2a
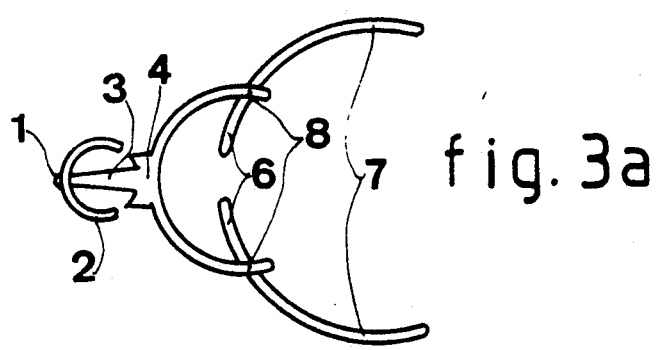
fig.3a
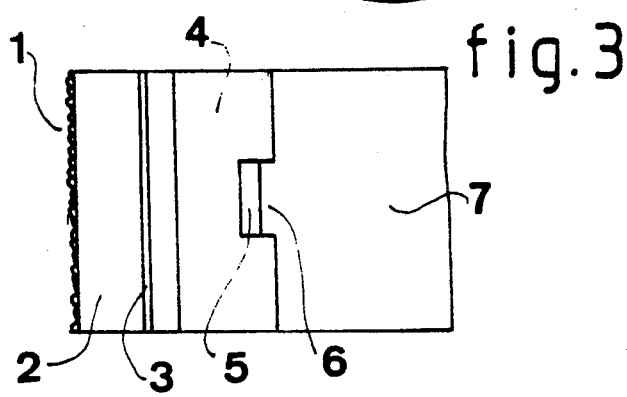
fig.3
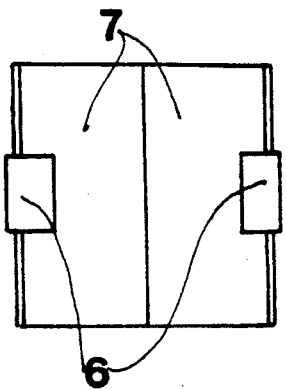
fig.4

SET OF DEVICES FOR ASSEMBLING PANELS TOGETHER AND FOR CONNECTING TUBES

This is a continuation of application Ser. No. 07/072,367 filed as PCT/FR86/00329, Sep. 26, 1986, now abandoned.

FIELD OF THE INVENTION

The present invention relates to a set of devices "Clip, Profile, Tube, Cap, Right-Angled Brace" enabling the assembly and superposition of panels with one another as well as the connection of tubes.

BACKGROUND OF THE INVENTION

In the field of modular production, the major disadvantage is not being able to obtain flat assemblies without a separation between the intermediate panels and tubes.

All systems of this type exclusively use the round tube as a pivot point.

Mounting and unmounting using force and the complexity of certain assemblies are generally posed to the user.

SUMMARY OF THE INVENTION

The CLIP device in accordance with the invention is composed of a toothed projection which is three-fourths cylindrical and which is connected by a central wall to a larger cylindrical part which contains on each side and at its mid-point a cut-out in which a tongue is arranged which extends at right angles into a decoupling forming a panel.

At approximately 5 mm from each of the edges of the largest cylindrical part, and through each of the walls, on either side of the tongues, an axis enables the panels to pivot for the introduction or release of the tube (round or square).

In accordance with one embodiment, the ends of the tongues comprise a cog situated in the convex part which, at the same time as the introduction of a tube, enables fixation to the profile. For this embodiment, a U-shaped profile is used which comprises a small right angle return situated opposite the high part of the U.

In accordance with other embodiments, the projections can be of varied shapes, "round, oval, polygonal, or any other shapes characterized by a hollow projection comprising open or totally closed walls".

The PROFILE device in accordance with the invention has concave edges which conform closely to the cylindrical body of the clip. The central housing has a constricted opening. The housing has teeth at its center. Three possibilities exist for seating the interior panels: on the side two lateral housings, and at the center of a larger housing. At mid-point, one of the walls of the central housing contains a progressively projecting passage which acts as a cog.

The TUBE device in accordance with the invention comprises edges which are cut away so as to be aligned with the driving edges of the profile. The interior is hollow.

The CAP device in accordance with the invention has the shape of a cam whose opposite edges have a larger diameter than the square of the tube, which edges can only be introduced diagonally from a square or round tube. For this latter hypothesis, an internally squared screw plate is used. At mid-point, the inversion of the edges provides the depth abutment. Placed in each of the parts of two tubes to be joined and turning with more or less force, alignment of the square sections is obtained, as is an effective connection which is insensitive to separation stress.

The "Clip, Square Tube, Profile" complex enables an assembly of panels to be aligned on a same plane in relation to the tubes. The combined working of these three devices removes the separation between the panels and the tubes.

In accordance with one embodiment, the Cap device can comprise several exits which provide the possibility of multiple productions of modular assemblies or connections of joints for three-dimensional assemblies.

The RIGHT-ANGLED BRACE device in accordance with the invention contains on its internal surfaces a projection which is three-fourths cylindrical and which is connected by a central wall to the right-angled brace assembly. Each of its open walls comprises a hollow compartment. Over the entire length of their bases, the projections contain teeth.

In accordance with alternative embodiments, the projections can be of varied shapes "round, oval, polygonal, or any other shapes characterized by hollow projections comprising open or totally closed walls".

The Profile, the Tube, the Cap and the Right-Angled Brace can be produced in aluminum. In accordance with a preferred embodiment, the Clip assembly is produced in "DELRIN" (mark applied for) acetal resin.

The assembly of devices in accordance with the invention is particularly intended for the production of partitions and is perfectly suited to the building of stands.

BRIEF DESCRIPTION OF THE DRAWINGS

FIG. 1 is a side elevational view of a hollow tube and a clip device coupled thereto;

FIG. 2 is a plan view of a right-angled brace forming an embodiment of the invention;

FIG. 2a is an end view of a leg of the brace of FIG. 2;

FIG. 3 is a plan view of the clip of FIG. 1;

FIG. 3a is a side view of the clip of FIG. 3;

FIG. 4 is a front elevational view of the clip of FIG. 3;

DESCRIPTION OF THE PREFERRED EMBODIMENTS

Figure 7A:
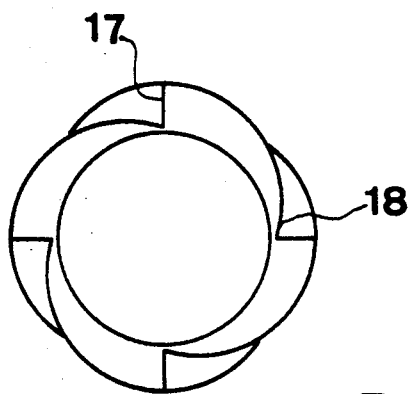
FIG. 7a is an end view of the cap of FIG. 7.

The alternative embodiment of the Cap device (21, 22, FIG. 8) is suitable for assemblies or connections requiring no tools or fixing screws, and finds its place in various fields of use.

The CLIP device shown in FIGS. 3 and 4 is composed of a toothed projection (1) which is three-fourths cylindrical (2) and is connected by a central wall (3) at three-fifths of a larger cylindrical part (4) comprising two cut-outs (5) situated at midpoint in which two tongues (6) are provided which extend at right angles into a decoupling forming each one-fifth of a panel (7). Two axes (8) enable the pivoting of the tongues, and the opening or closing of the cylinder forming the body of the clip.

Figure 5:
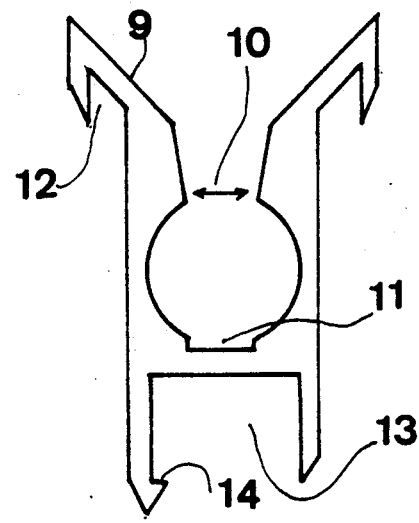
FIG. 5 is a plan view of a profile device having two concave edges.

The PROFILE device shown in FIG. 5 comprises two concave edges (9). The central housing has a constricted opening (10). At its center, the housing contains teeth (11).

Three possibilities exist for seating the interior panels: on the side two lateral housings (12) and, at the center of a larger housing (13) containing at mid-height and on one of the partitions a progressively projecting passage serving as a cog (14).

Figure 6:
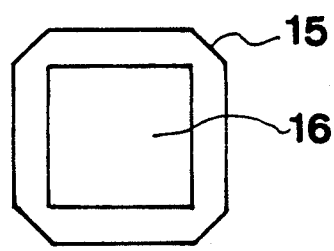
FIG. 6 is an end view of a tube employed in the embodiment of FIG. 1.

The TUBE device shown in FIG. 6 contains cutaway edges (15). The interior is hollow (16).

Figure 7:
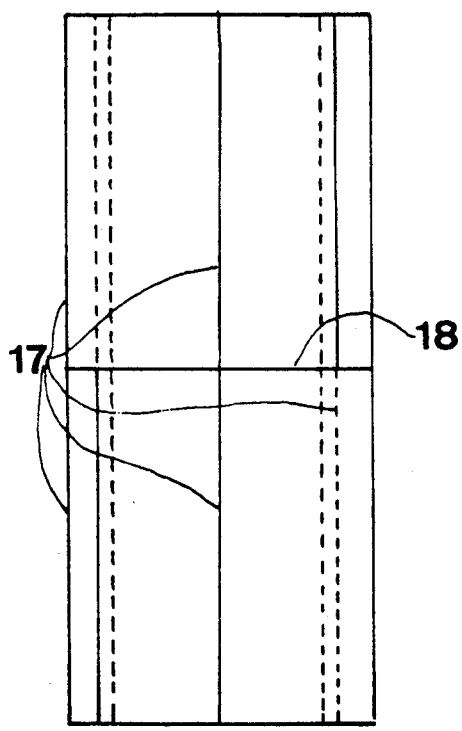
FIG. 7 is a vertical elevational view of a cap forming another embodiment of the invention.

The CAP device shown in FIG. 7 has the characteristics of a cam whose opposite edges (17) have a larger diameter than the square of the tube, and which can only be introduced at a diagonal into the square tube (15). At mid-height, the inversion of the edges (18) provides the depth abutment. Internally, the cap can be hollow or solid.

Figure 9:
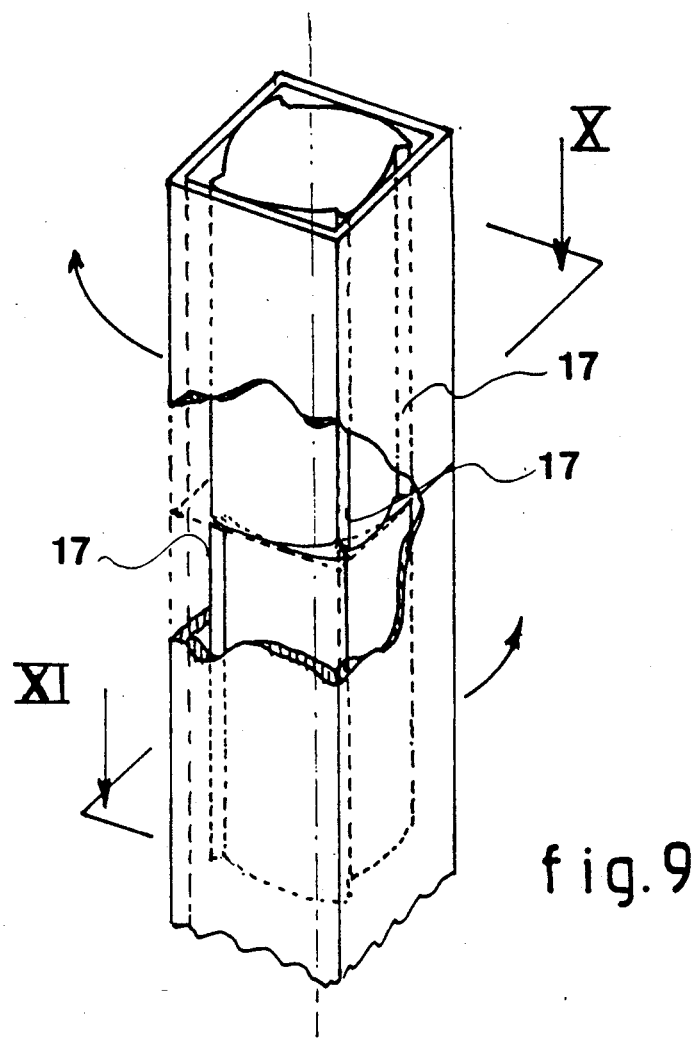
FIG. 9 is a perspective view, partially broken away of a tube and cap assembly.

FIG. 9 is a perspective view of a CAP device of FIG. 7 inserted within upper and lower edge abutting square tube of the type shown in FIG. 6.

Figure 10:
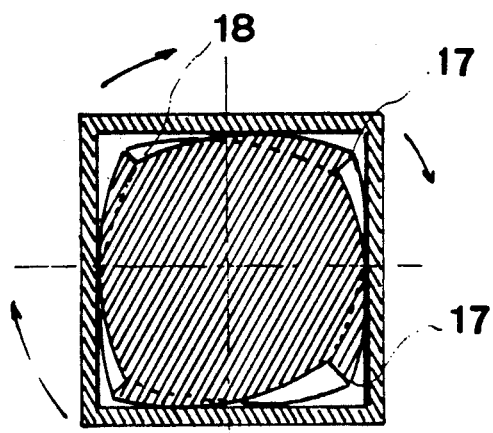
FIG. 10 is a sectional view taken in the plane X.

FIG. 10 is a transverse sectional view through FIG. 9 about line X.

Figure 11:
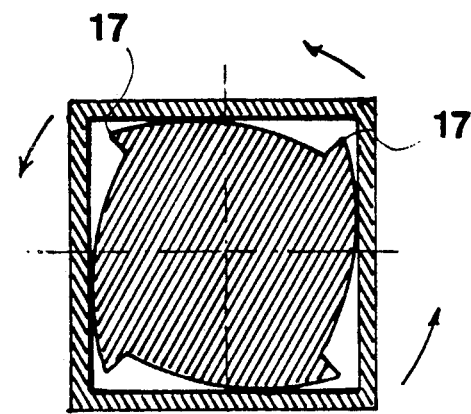
FIG. 11 is a transverse sectional view of the assembly of FIG. 9 taken in the plane X1.

FIG. 11 is a transverse sectional view through FIG. 9 about line XI.

Figure 12:
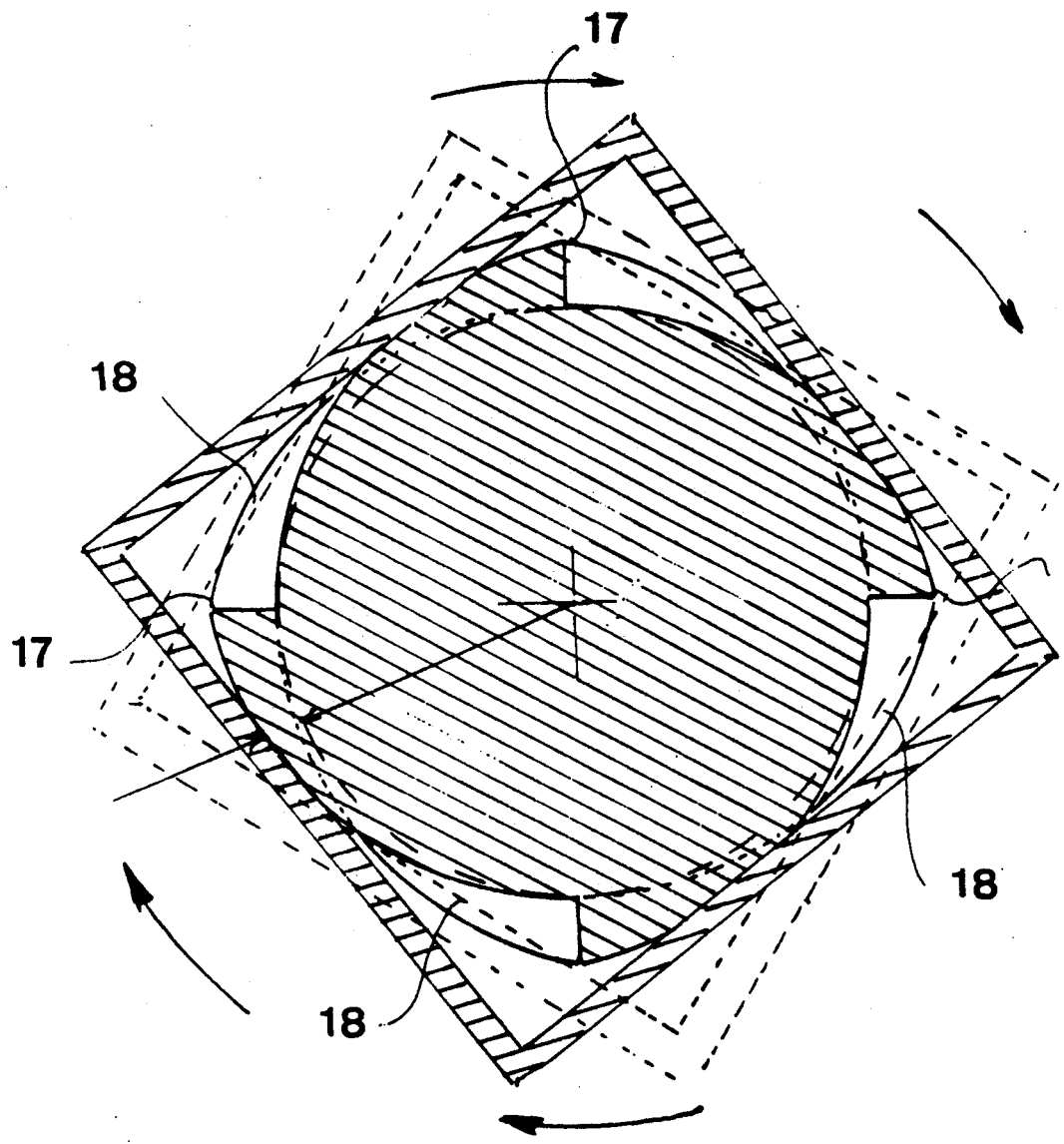
FIG. 12 is a sectional view through the assembly of FIG. 9 illustrating the opposite direction of rotation of the first and second tubes with respect to the cams of the upper half and lower half.

FIG. 12 is an enlarged view similar to that of FIG. 10 illustrating the positioning of the cam during insertion of the CAP device until the end of the tube abuts an inversion edge of the opposite throw cams of the lower half of the CAP device.

The CAP device is introduced into the square hollow of one tube (15) until the end of the tube abuts on the inversion edge (18) of the lower half cam whose edges (17) face rotatably oppositely to the edges of the upper half cams. In FIGS. 9 and 10, the upper half cams have edges which face clockwise. In FIGS. 9 and 11, the lower half cams have edges which face counter-clockwise. After this operation, the tube (15) and the CAP device of FIG. 7 are rotated coaxially one relative to the other until the cams abut with the interior surface of the square hollow of the tube as illustrated in full lines, FIGS. 10 and 12. The same is done with a second tube (15), however, the cams of the CAP device turn in the opposite direction and rotation of the second tube is opposite to that of the first tube to effect the same type of engagement between the cam exterior surface and the interior surface of the square hollow tube. The difference in directions of rotation ar illustrated graphically in FIGS. 9, 10 and 11 for the two tubes (15).

The RIGHT-ANGLED BRACE device shown in FIG. 2 comprises on its internal surfaces a projection which is three-fourths cylindrical (19). The base of said projections contains teeth (20).

Figure 8:
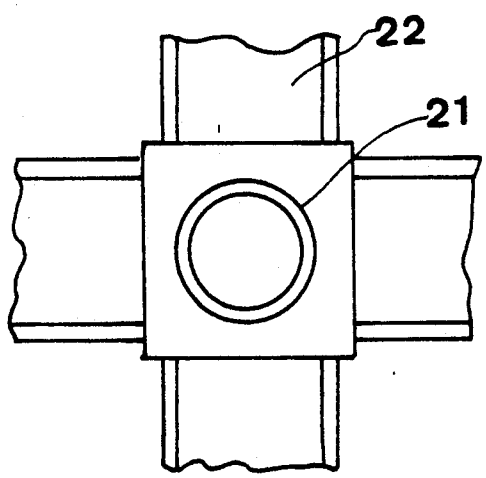
FIG. 8 is a plan view of a portion of a cross-shaped ovalization forming another embodiment of the invention.

The alternative embodiment of the CAP device shown in FIG. 8 comprises a cross-shaped ovalization (21) which can contain several exits.

It is claimed:

1. An assembly device for connecting two first members each having a substantially square hollow, comprising a cam shaped member having a longitudinal axis and having opposite, first and second end portions, each of said end portions comprising a plurality of paired opposite transverse edges, said edges extending substantially parallel to said longitudinal axis, and the edges of one portion facing in an opposite rotational direction from the edges of the other portion, a diameter from an opposing pair of said edges at each portion passing through said longitudinal axis gradually increasing from a first diameter to a second diameter along a rotation path about said longitudinal axis, said second diameter being less than a diagonal transverse length of said square hollow and being greater than a perpendicular transverse length of said square hollow, whereby said cam shaped member is insertable longitudinally into said square hollows of said two first members and said two first members are turnable about said longitudinal axis with respect to said cam shaped member to place said two first members in abutment therewith, such that the inversion of the edges provides a strong assembly in turning about the axis with respect to the cam shaped members until the cam shaped members are in abutment with the two square hollow first members.

2. An assembly device as recited in claim 1, wherein said first diameter is substantially less than said perpendicular transverse length of said square hollow.

3. An assembly device as recited in claim 2, wherein each of said end portions consist of two of said opposing pairs of said edges.

4. An assembly system as recited in claim 3, further comprising two tubes, said tubes being said first members.

* * * * *